United States Patent Office 3,349,048
Patented Oct. 24, 1967

3,349,048
METHOD FOR MAKING LINEAR
POLYDIARYLSILOXANES
Howard A. Vaughn, Jr., Scotia, N.Y., assignor to General
Electric Company, a corporation of New York
No Drawing. Filed Nov. 17, 1965, Ser. No. 508,393
8 Claims. (Cl. 260—18)

ABSTRACT OF THE DISCLOSURE

A method for making linear polydiarylsiloxane from diarylsilanediol. A paste of a diarylsilanediol, an inert organic solvent and metal soap is heated to effect a polymerization of the diarylsilanediol. A linear polydiarylsiloxane of varying molecular weight can be made which can be utilized to produce polydiarylsiloxane-organopolysiloxane block copolymers.

This application is a continuation-in-part of my application Ser. No. 256,137 filed Feb. 4, 1963, now abandoned, and assigned to the same assignee as the present invention.

The present invention relates to a method for making polydiarylsiloxanes, such as linear polydiphenylsiloxanes. More particularly, the present invention relates to a method for effecting reaction between diarylsilanediol molecules such as diphenylsilanediol and to the products produced thereby.

Although it is generally known that polyarylsiloxanes are generally highly crystalline materials, a variety of useful products such as molding compounds and elastomers of superior tensile strength can be made from copolymers of diarylsiloxane and dialkylsiloxanes. In addition, copolymers of chemically combined arylsiloxanes and alkylsiloxanes have greater heat and oxidative stability than the corresponding polyalkylsiloxanes.

Prior to the present invention, one method for making copolymers of arylsiloxanes and alkylsiloxanes was by cohydrolyzing arylhalosilanes and alkylhalosilanes and recovering the cohydrolyzate. Those skilled in the art know that this method is unsuitable for producing high molecular weight materials, such as copolymers useful for making elastomers. Another method for making copolymers having chemically combined diarylsiloxy units and other diorganosiloxy units is by equilibrating the respective diorganosiloxy units in the form of mixtures of small cyclic siloxanes, as taught in Johannson Patent 2,994,684. It is known that the equilibration of such organosiloxy units in the form of mixtures of cyclic siloxanes, for example, hexaphenylcyclotrisiloxane, results in the formation of much higher molecular weight copolymers than that provided by cohydrolysis of the corresponding organohalosilanes. Although such equilibration methods provide for the production of numerous useful copolymers, such methods cannot be employed to make a variety of block copolymers having blocks of a minimum predetermined size. For example, equilibration of mixtures of cyclopolydiarylsiloxane and cyclopolydialkylsiloxane, which utilize a minor amount of cyclopolydiarylsiloxane will produce polydiarylsiloxane blocks having in most instances no more diarylsiloxy units than the original cyclopolydiarylsiloxane utilized.

As shown in my copending application Ser. No. 256,136 filed Feb. 4, 1963, and assigned to the same assignee as the present invention, a variety of useful copolymers can be made which have diarylsiloxane blocks composed of at least five diarylsiloxy units combined chemically with other diorganosiloxane blocks. These copolymers are quite unique as they have a high degree of crystallinity and tensile strength. In order to make these copolymers it is necessary to utilize linear polydiarylsiloxanes having at least 5 chemically combined diarylsiloxy units. Prior to the present invention, no satisfactory method was known for making polydiorganosiloxane of a predetermined block size.

The present invention is based on the discovery that linear polydiarylsiloxane, such as polydiphenylsiloxane, having at least about five chemically combined diarylsiloxy units can be made by heating a paste of a metal salt of a fatty acid, a diarylsilanediol, and an organic solvent to a temperature between 20° C. to 225° C. The resulting polydiarylsiloxane advantageously can be copolymerized with different polydiorganosiloxanes to form various block copolymers.

In accordance with the present invention there is provided a method comprising (1) forming a paste consisting essentially of a fatty acid metal salt, a diarylsilanediol and an organic solvent to provide for a proportion of from 0.1% to 3% by weight of metal, based on the weight of the diarylsilanediol, (2) heating said paste of (1) to a temperature between 20° C. to 225° C., and (3) recovering from the product of (2) a polydiarylsiloxane.

A critical feature of the present invention is that the diarylsilanediol and fatty acid metal salt, referred to hereinafter as "metal soap" must be utilized in combination with an organic solvent. The presence of the organic solvent serves to facilitate the uniform distribution of the metal soap throughout the diarylsilanediol. It has been found that the amount of organic solvent utilized should be insufficient to completely dissolve the diarylsilanediol metal soap mixture during the intercondensation of the diarylsilanediol to the higher molecular weight state. Preferably, a paste of the solvent, diarylsilanediol, metal soap mixture is utilized. Experience has shown that insufficient solvent will not provide for uniform distribution of metal soap throughout the diarylsilanediol. As a result intercondensation of diarylsilanediol molecules to polydiarylsiloxane will proceed erratically. On the other hand, it has been found that if an excess of solvent is utilized which is sufficient to completely dissolve the components of the mixture during polymerization of the diarylsilanediol, formation of cyclopolydiarylsiloxane instead of the desired linear polymer will be favored.

The diarylsilanediols that can be employed in the practice of the invention have the formula (1) 

where R is a member selected from an aryl radical and a halogenated aryl radical.. Radicals included by R are for example, phenyl, tolyl, xylyl, naphthyl, chlorophenyl, fluorotolyl, etc. R can be the same radical or any two of the aforementioned R radicals.

Diarylsilanediols that are included by Formula 1 are for example, diphenylsilanediol, phenyltolylsilanediol, bis-(2,chlorophenyl)silanediol, dinaphthylsilanediol, etc.

Metal soaps that can be employed in the practice of the invention have the formula (2)  

where M is a metal selected from Group I through Group VIII of the Periodic Table, Z is a monovalent carboxylic acid radical derived from a carboxylic acid having from 1 to 23 carbon atoms, $a$ is the same as the valence of M, and is an integer equal to from 1 to 4, inclusive.

The metals that are included by M of Formula 2 are more particularly Group I metals such as sodium, potassium, lithium, copper, silver; Group II metals such as calcium, strontium, barium, beryllium, magnesium, zinc, cadmium, mercury; Group III metals such as cerium, aluminum; Group IV metals such as titanium, zirconium, tin, lead; Group V metals such as antimony, bismuth; and metals of Group VI, VII and VIII such as chromium, manganese, iron, nickel, etc. Included by carboxylic acid radicals represented by Z of Formula 2 are radicals derived from such carboxylic acids as caproic, capric, acetic, hexoic, lauric, myristic, palmitic, stearic, arachidic, etc. Soaps that are included by Formula 2 are for example, aluminum laurate, aluminum oleate, barium naphthenate, cadmium stearate, calcium naphthenate, copper naphthenate, iron naphthenate, lead oleate, zinc stearate, stannous octoate, etc.

In the practice of the invention, a paste is made by mixing the metal soap, the diarylsilanediol and an organic solvent. The paste of the "soap," "diol," and solvent is then heated to convert the diol to the polymeric state. The polymer is then recovered from the mixture.

Organic solvents that can be employed for example, are aliphatic alcohols such as methanol, ethanol, etc.; hydrocarbon solvents such as n-hexane, petroleum ether, etc.; and other solvents including chloroform, ether, etc.

The paste can be heated to effect the polymerization of the diol to polyarylsiloxane. Temperatures between 20° C. to as high as 200° C. can be employed to effect diol polymerization. Experience has shown that a temperature of about between 50° C. to about 75° C. will produce relatively low molecular weight polyarylsiloxane having about 5 or more chemically combined diarylsiloxy units. Somewhat larger polyarylsiloxanes can be formed at temperatures between about 140° C. to about 175° C. Temperatures that exceed 250° C. however, particularly after extended periods of time, such as 24 hours or more usually result in the formation of polyarylsiloxanes which are unsuitable for making polyarylsiloxane copolymers.

At the completion of the polymerization reaction, it has been found expedient to treat the product with an organic solvent to selectively remove low molecular weight and unreacted products from the polyarylsiloxane. In the instances where low molecular weight polyarylsiloxanes are formed, the reaction product can be treated with boiling methanol to dissolve away undesirable products. Higher molecular weight polyarylsiloxanes, resulting from heating the paste to a temperature between about 100° C. to 175° C., can be treated with boiling toluene at a pressure of about 760 mm. In instances where temperatures exceeding about 175° C. have been employed, it hase been found expedient to treat the polyarylsiloxane with boiling chlorobenzene; products insoluble in boiling chlorobenzene at atmospheric pressure, i.e., 760 mm., are usually of such high molecular weight that they are unsuitable for making polyarylsiloxane-polyalkylsiloxane copolymers. The recovery of the chlorobenzene soluble materials however, can be performed by filtration and precipitation from the solvent followed by further treatment, as above in accordance with well known procedures of the art.

In order that those skilled in the art will be better able to practice the invention, the following examples are given by way of illustration and not by way of limitation. All parts are by weight.

Example 1

Two parts of stannous octoate were stirred into a paste of 130 parts of diphenylsilanediol and 40 parts of methanol. The methanol was removed from the paste under reduced pressure at 25° C. A liquid product formed. It was heated to a temperature of 150° C. for a period of about 40 hours. The resulting solid product was treated with boiling toluene under atmospheric conditions. The insoluble residue was recrystallized from boiling chlorobenzene to yield 105 parts of product. The product was found to have a softening point above 200° C. Infrared showed that the product had less than 0.1% silanol. The product was then heated under reduced pressure at a temperature of about 200° C. for 24 hours. The resulting product obtained was insoluble in boiling chlorobenzene. Based on the above results, the product that was recrystallized from boiling chlorobenzene had about 170 chemically combined diphenylsiloxy units. It was also silanol chain-stopped because it had polymerized to a higher polymeric state by being heated at a temperature of 200° C. under reduced pressure.

Example 2

The procedure of Example 1 is repeated except that the liquid product which forms by the removal of methanol is heated at a temperature of about 95° C. for 17 hours. The product is allowed to cool and treated with boiling methanol. The methanol insoluble residue is recovered by filtration. It is found to have a silanol content of 0.8% based on the Zerewitinoff method. The product is a silanol-stopped polydiphenylsiloxane having an average of at least about 21 chemically combined diphenylsiloxy units.

Example 3

A paste was prepared consisting of 7 parts of diphenylsilanediol and 7 parts of n-hexane. There was stirred into the paste, 0.05 part of stannous octoate. The n-hexane was evaporated from the mixture by exposing it at room temperature under atmospheric condition. Traces of solvent also were removed by subjecting the mixture to reduced pressure for a short period of time. The mixture was then heated at 150° C. for 18 hours. A product was obtained which did not soften at 200° C. Following the same procedure used in Example 1, it was found to be a silanol-stopped polydiphenylsiloxane which was soluble in boiling chlorobenzene under atmospheric conditions but insoluble in boiling toluene under atmospheric conditions.

Equal parts of the above prepared polymer and a hydroxy chain-stopped polydimethylsiloxane of about 3,000 centipoises at 25° C. were mixed together in chlorobenzene. There were then added to the mixture, 1% by weight of the polydiphenylsiloxane and silanol-stopped oil, of the stannous octoate catalyst. The mixture was refluxed for about 24 hours resulting in the formation of a product. The product was recovered from the mixture by precipitating it with methanol. After the product had been dried, it was found to be a rubbery material. Infrared showed that it was a copolymer. The product was blended with fumed silica on a mill and 1½ parts, per 100 parts of the product of benzoyl peroxide. The mixture was then press-cured at 140° C. An elastomer was obtained which exhibited a high degree of tensile strength and which was satisfactory for insulating applications.

Example 4

Various mixtures were prepared at about 25° C. by adding, with stirring, 0.02 part of metal in the form of a metal soap to a paste of 10 parts of diphenylsilanediol and 4 parts of methanol. The methanol was removed under reduced pressure after the soap had been thoroughly dispersed throughout each of the respective mixtures. The mixtures were then heated to 150° C. and the products recovered and analyzed as in Example 1. "Soap" below indicates the metal soap employed, "Heated" shows the time required at 150° C. to obtain a solid product, and "M.P." shows an approximate melting or softening point of the solid.

| Soap | Heated (hrs.) at 150° C. | M.P. (° C.) |
| --- | --- | --- |
| Iron Octoate | 23 | 200 |
| Cobalt Octoate | 4 | <200 |
| Zinc Octoate | 23 | <200 |
| Lead Octoate | 1 | 200 |
| Potassium Naphthenate | 23 | <200 |

Based on the above results, one skilled in the art would know that the method of the present invention provides for the production of useful polydiarylsiloxane polymers. These polymers can be employed for the production of a variety of copolymers having blocks of polydiphenylsiloxanes and a variety of polydiorganosiloxanes.

While the foregoing examples have been limited to only a few of the very many variables within the scope of the present invention, it should be understood that the present invention is directed to a method for making a wide variety of polydiarylsiloxane polymers. In addition, the method of the present invention also involves the employment of a wide variety of metal soap catalysts as shown by Formula 2 and the use of various solvents and conditions utilized to form the polydiarylsiloxane polymers of the present invention.

What I claim as new and desire to secure by Letters Patent of the United States is:

1. A method for making linear diarylpolysiloxane composed of at least five chemically combined diarylsiloxy units comprising (1) forming a paste consisting essentially of a substantially inert organic solvent, a diarylsilane diol, and a metal salt of a fatty acid utilized in said paste in an amount sufficient to provide for a proportion of from 0.01 percent to 3 percent by weight of metal, based on the weight of said diarylsilane diol, (2) effecting the removal of said substantially inert organic solvent from said paste, (3) heating the resulting product of (2) to a temperature between 20° C. and 225° C. and (4) recovering linear polydiarylsiloxane from (3).

2. The method of claim 1 where said metal salt of a fatty acid is stannous octoate.

3. A method in accordance with claim 1 where the metal salt of a fatty acid is lead octoate.

4. A method for making linear diphenylpolysiloxane composed of at least five chemically combined diphenylsiloxy units comprising (1) forming a paste consisting essentially of a substantially inert organic solvent, diphenylsilanediol and a metal salt of a fatty acid utilized in said paste in an amount sufficient to provide for a proportion of 0.01 percent to 3 percent by weight of metal based on the weight of diphenylsilane diol, (2) effecting the removal of said substantially inert organic solvent from said paste of (1), (3) heating the resulting product of (2) to a temperature between 20° C. to 225° C. and (4) recovering linear polydiphenylsiloxane from (3) which is soluble in boiling chlorobenzene under atmospheric conditions, where said metal salt of a fatty acid is a salt of a metal selected from the class consisting of iron, cobalt, lead, zinc, potassium and tin.

5. The method of claim 4 where said polydiphenylsiloxane is soluble in boiling methanol under atmospheric conditions.

6. A method in accordance with claim 4 wherein (3) there is utilized a temperature between 140° C. to 175° C.

7. The method of claim 4 where said metal salt of a fatty acid is stannous octoate.

8. The method of claim 4 where said metal salt of a fatty acid is lead octoate.

References Cited

UNITED STATES PATENTS

| | | |
|---|---|---|
| 2,687,388 | 8/1954 | McNulty et al. |
| 2,902,468 | 9/1959 | Fianu _____ 260—46.5 |
| 3,267,072 | 8/1966 | Delman et al. _____ 260—46.5 |
| 3,274,153 | 9/1966 | Hyde et al. _____ 260—46.5 |

DONALD E. CZAJA, *Primary Examiner.*

C. W. IVY, *Assistant Examiner.*